Musser & Coleman,
Tobacco Press,
No. 252, A.I. Patented Oct. 4, 1859.
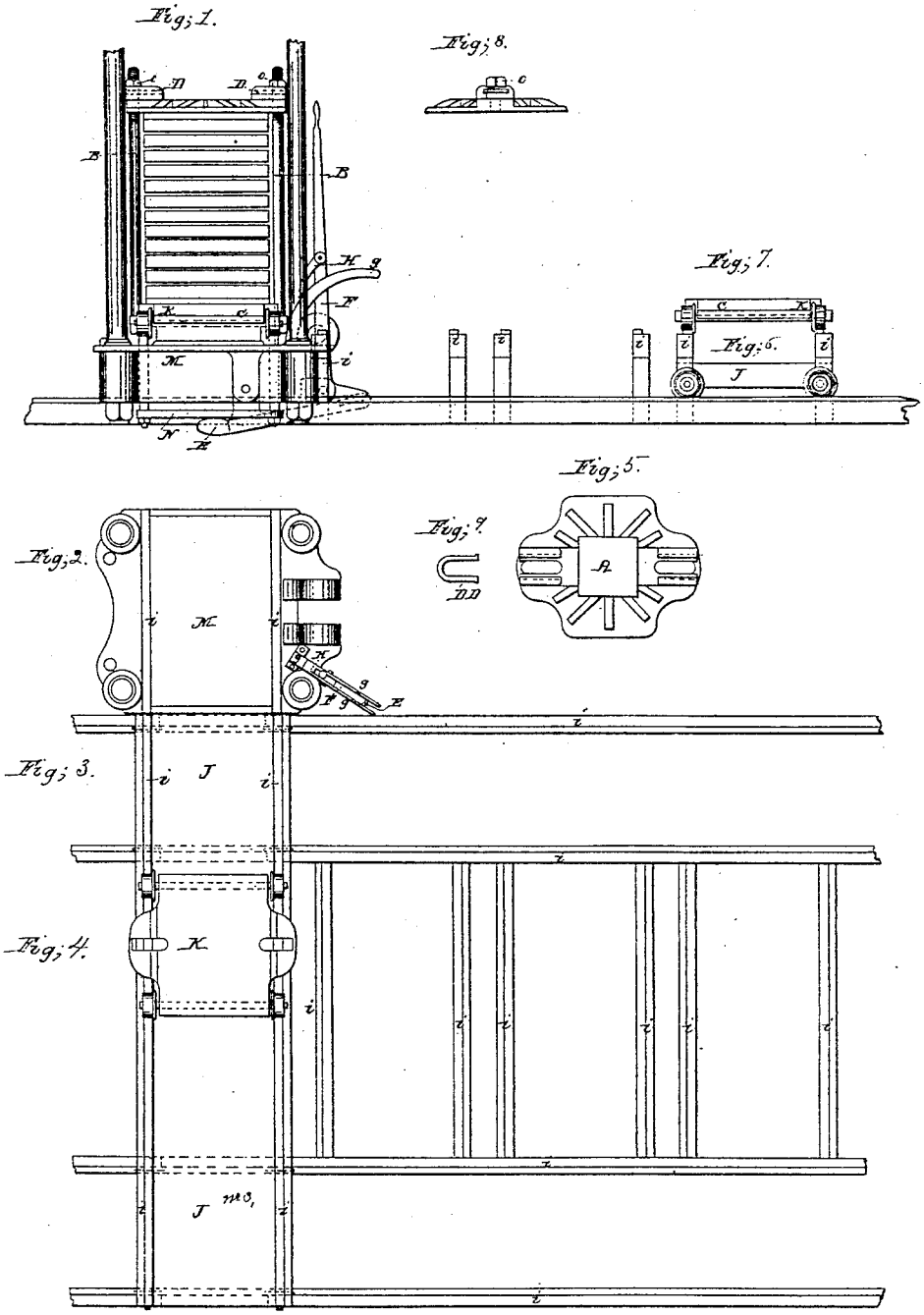
Witnesses;
James S. Mof
Henry S. Sullivan
Inventors;
Wm. Hop Musser
John Coleman
AM. PHOTO-LITHO. CO. N.Y. (OSBORNE'S PROCESS)

UNITED STATES PATENT OFFICE.

WM. R. MUSSER AND J. COLEMAN, OF LYNCHBURG, VIRGINIA.

IMPROVEMENT IN TOBACCO-PRESSES.

Specification forming part of Letters Patent dated February 2, 1858; Additional Improvement No. 252, dated October 4, 1859.

*To all whom it may concern:*

Be it known that we, WILLIAM R. MUSSER and JOHN COLEMAN, both residents of Lynchburg, in the State of Virginia, have made certain improvements in our tobacco-press since the issuing of Letters Patent dated February 2, 1858; and we do hereby declare that the following is a full and exact description of the improvements unclaimed before in our original specification, together with certain improvements made since, reference being had to the accompanying drawings, and to the letters of reference marked thereon.

The nature of this invention having been already fully described in our previous specification, we proceed to describe the improvements in our press, together with what we claim as original.

A A is the top plate of the press for retaining pressure on tobacco or any other article requiring to be pressed, and B B are clamp-bars also used for retaining pressure.

*o o* are nuts or clamp-bars, and D D are movable washers, of U shape, used for connecting nuts *o o* on the clamp-bars, also for raising the top plate, A A, and for removing the pressure from whatever articles may be placed within the press.

*c* is the bottom plate of the press, for retaining pressure, and at the same time acting as the bed of the main truck, by means of two grooves in the bed of the press. The truck is held in a steady position while pressure is being had from above.

E is the bottom lever, used for raising or lowering the track of the press, and F is the upright lever that acts on the bottom lever, E, for raising the same.

*g* is the guard for the upright lever, and H is the pawl on the guard *g*, for keeping the upright lever in place while the track of the press is wanted up.

I *i i i i* are the several tracks, upon which the different trucks are shifted and moved to any point desired.

J J J is the bottom or right-angle truck, for for shifting the main truck from track to track.

K K K is the main truck, upon which the articles to be pressed are placed, and M is the sill of the press, and N is the cross, upon which the bottom lever, E, acts to raise the track in the press.

Having thus fully described our improvements, what we claim as new therein, and desire to secure by additional Letters Patent, in addition to those improvements already patented, dated February 2, 1858, is—

1. The top plate of the press, marked in two drawings, as A, and No. 5 A, in connection with the bottom plate of said press, marked in the drawings as *c*, used for retaining pressure and forming the bed of the main truck, constructed as described.

2. The groove-nuts for raising and lowering the top plate of the press without taking it from the bars, as described.

WM. R. MUSSER.
JOHN COLEMAN.

In presence of—
JAMES S. MOSS,
CHARLES HENRIX.